INVENTOR
R. J. COLLIER
BY
Roderick B. Anderson
ATTORNEY

United States Patent Office 3,484,147
Patented Dec. 16, 1969

3,484,147
HOLOGRAM STORAGE APPARATUS AND METHOD USING A DIFFUSING MEDIUM
Robert J. Collier, New Providence, N.J., assignor to Bell Telephone Laboratories Incorporated, Murray Hill, N.J., a corporation of New York
Filed Aug. 11, 1966, Ser. No. 571,889
Int. Cl. G02b 17/00; G02f 1/28
U.S. Cl. 350—3.5                                    6 Claims

ABSTRACT OF THE DISCLOSURE

A method and apparatus are described for recording several holograms on the same portion of a photosensitive recording medium. The first hologram is formed by directing light from a subject through a first diffuse medium to the photosensitive medium where the light interferes with a phase-related reference beam incident on the photosensitive medium at a first angle. Additional holograms are formed by successively directing light from other subjects through different diffuse media to the recording medium and interfering each beam of light with a reference beam incident on the photosensitive medium at the same first angle. To reconstruct an image of a particular subject stored in one of the holograms, the holograms are illuminated by a beam traveling in a direction antiparallel to the reference beam. A real image of a particular subject is observed when light from the illuminated holograms is directed back through a diffuse screen having the same optical properties as those of the diffuse screen used in forming the hologram of the particular subject.

---

Figure 1:
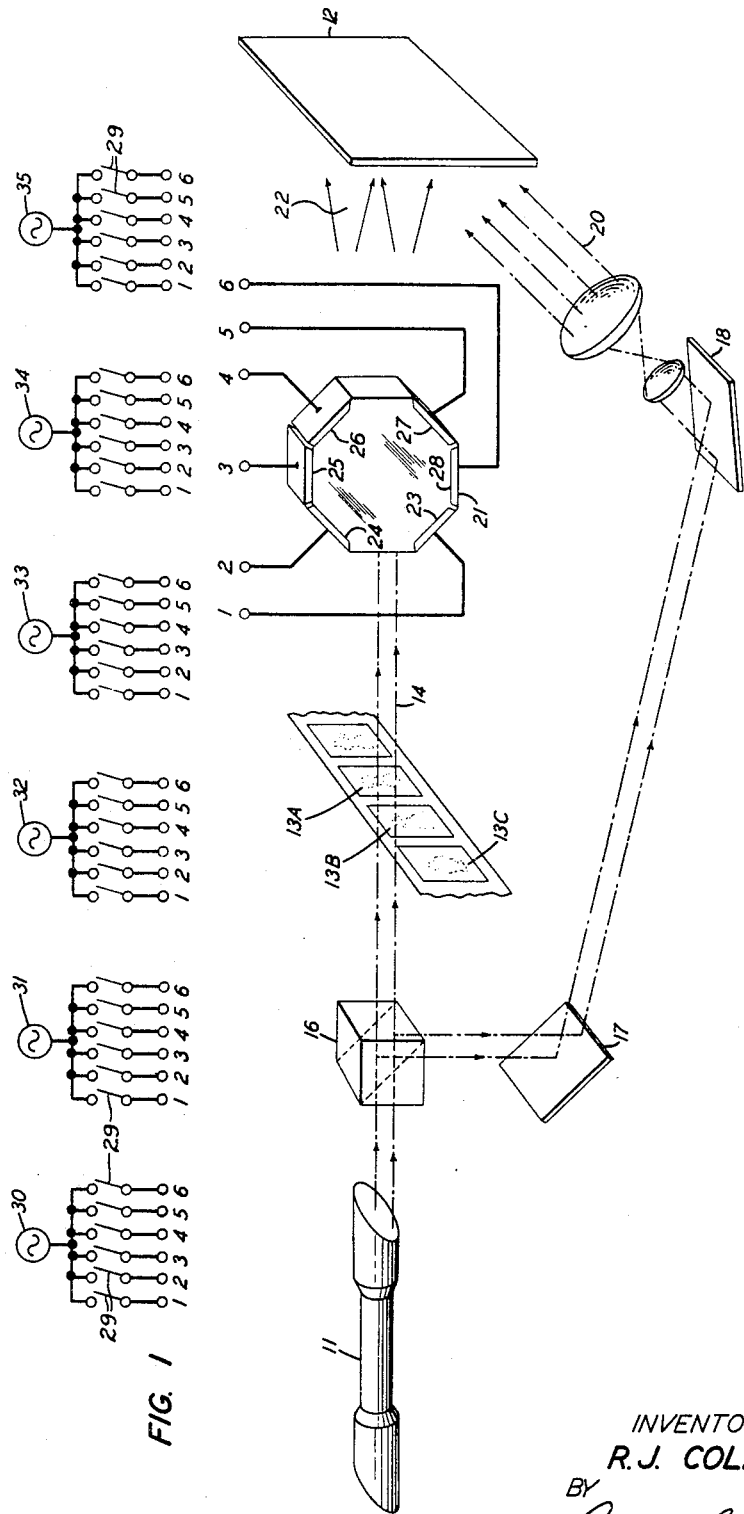

This invention relates to methods and apparatus for storing and retrieving information, particularly optical information.

The copending application of K. S. Pennington, filed Mar. 29, 1966, Ser. No. 538,368, and assigned to Bell Telephone Laboratories, Incorporated, descrbes a system for storing a plurality of discrete images on a single hologram and selectively retrieving any of the stored images. A hologram is a photographic recording made by the interference of a subject beam, containing an image to be recorded, with a reference beam. Hologram recordings of a number of different images can be superimposed on a single photographic medium by successively projecting different subject beams against the medium at different angles, with each successive reference beam also being directed at a different angle. The desired stored image can be reconstructed by illuminating the developed hologram with a reference beam directed at the same angle as the corresponding reference beam that was used during the recording step. It can be shown that the number of images that can be stored, and the required angular separations of the successive beams used during recording, depend largely on the photographic medium used for making the hologram. If the angular separation of the successive beams is not sufficiently large, or if the angle of the reference beam during the reconstruction is not sufficiently accurate, two or more images may be reconstructed during the read-out step. The mixing of two distinct images or information quanta during read-out is known as cross-talk; it can be particularly deleterious if the system is used with automatic apparatus that is responsive to the reconstructed images or information.

The present invention is an alternative system for storing and selectively retrieving optical information which makes use of principles described in the application of K. W. Kogelnik, Ser. No. 503,287, filed Oct. 23, 1965, and assigned to Bell Telephone Laboratories, Incorporated. Ordinarily, optical information cannot be recovered after transmission through a diffusing medium because, by definition, the medium diffuses the information in an arbitrary and unpredictable manner. The Kogelnik application teaches that if a coherent light beam containing an image of a subject is projected through a diffusing medium to a photographic plate where a hologram is made by interference with a reference beam, the subject can be reconstructed by directing a reconstructing beam, which is the conjugate of the reference beam, through the hologram in a direction antiparallel to the reference beam path. The resulting diffracted light beam will then pass through the same diffusing medium and converge to a real image of the subject. For example, a modulated subject beam may be projected through a diffusing atmosphere to a front surface of a photographic plate where it interferes with a phase-related reference beam to form a hologram. The information is reconstructed by directing a reconstructing beam conjugate to the reference beam against the back surface of the hologram along the same path as the reference beam (but of opposite direction), and then through the same diffusing atmosphere.

It can be shown that the diffusing medium acts as an efficient filter; if there is any substantial change of the diffusing characteristics of the medium after recording, the stored image cannot be reconstructed. In accordance with my invention, a plurality of subject beams, each containing a different image or information quantum, are successively directed through a diffusing medium capable of different diffusing characteristics and superimposed by hologram recording on a single photographic plate. The reference beams used during the recording step need not be directed against the photographic plate at different angles as in the Pennington application. The stored images are selectively reconstructed by projecting a reconstructing beam conjugate to the reference beam against the back surface of the developed hologram antiparallel to the recording reference beam. The reconstructing beam is diffractured by the hologram, and the diffracted beam is next incident on a diffusing medium having the same characteristics as those of the diffusing medium used during the recording. A reconstructed image corresponding to the selected diffusing characteristics is then projected from the diffusing medium onto a screen. Hence, selective read-out of any of a number of stored information quanta can be made by choosing the appropriate diffusing medium characteristics.

In an illustrative embodiment of the invention, the various diffusing characteristics are formed by applying different combinations of alternating voltages to various electrodes of an accousto-optical medium. When information $a$ is being recorded, the subject beam is directed through the acousto-optical medium with a combination of voltages on the electrodes to give a first diffusing characteristic. Information $b$, $c$, etc., are recorded with other different successive voltage combinations. The information $a$ is then reconstructed by directing an antiparallel reconstructing beam through the developed hologram as described before, with the first voltage combination on the acousto-optical electrodes. The reconstructing beam is diffracted by the hologram and resolved by the acousto-optical medium to a real image of information $a$. Hence, selective read-out can be made quickly and efficiently by the use of electrical switching devices.

Figure 2:
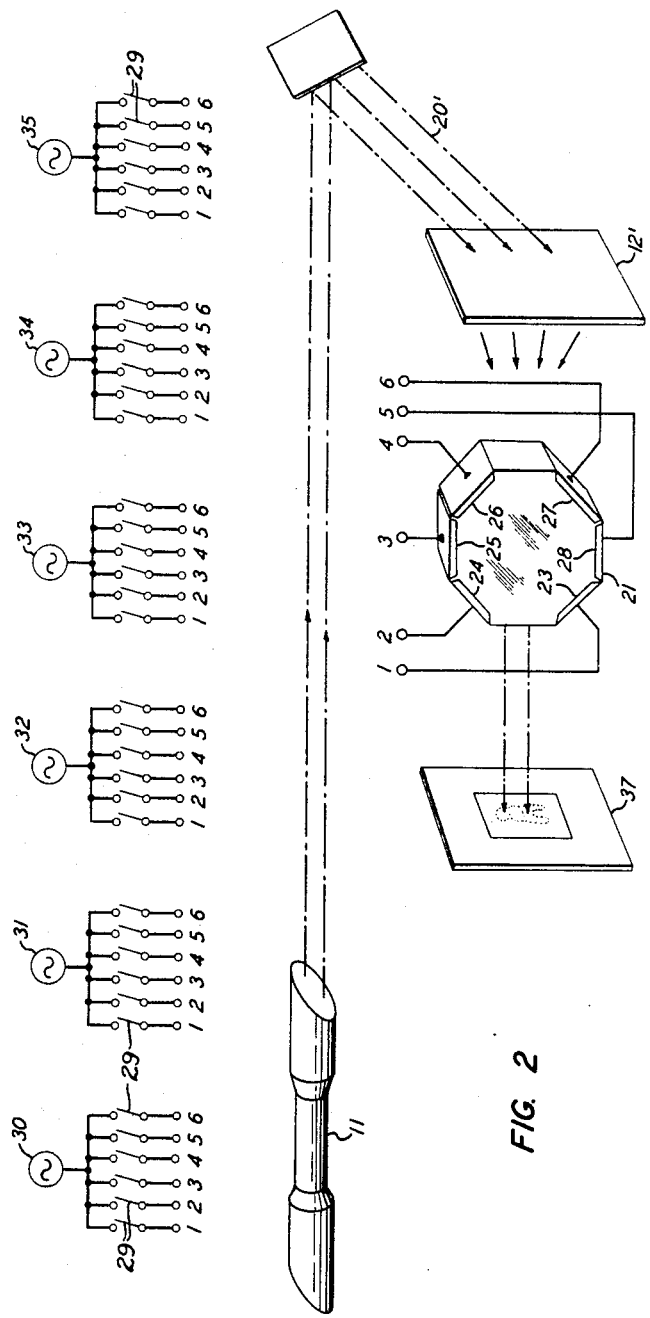

These and other features and advantages of the invention will be better understood from a consideration of the following detailed description taken in conjunction with the accompanying drawing in which:

FIG. 1 is a schematic illustration of a system for recording and storing a plurality of information quanta in accordance with an illustrative embodiment of the invention; and FIG. 2 is a schematic illustration of a system for selectively reading out information stored by the system of FIG. 1.

Referring now to FIG. 1 there is shown hologram recording apparatus comprising a source of coherent light 11, preferably a laser, for projecting light toward a front surface of a photographic medium 12. Part of the light is projected through a photographic transparency 13A and emerges as modulated subject light beam 14. The remaining generated light is reflected by a beam splitter 16 and mirrors 17 and 18 to the front surface of the photographic medium 12 as a recording reference beam 20. The subject beam 14 is projected through an acousto-optical diffusing medium 21 and impinges on the photographic medium as diffused subject beam light 22. Since the diffused subject beam and reference beam 20 are derived from the same source and are therefore phase-related, they interfere at the front surface of photographic medium 12 to form a hologram recording.

The purpose of the apparatus of FIG. 1 is to make superimposed hologram recordings of a number of images or information quanta on the photographic medium 12 which can be selectively reconstructed without cross-talk, that is, without any reconstruction of the unselected images. This is done by successively projecting the subject light beam through photographic transparencies 13A, 13B, 13C, and others, while successively changing the characteristics of the diffusing medium 21 for each separate exposure of the photographic plate 12.

In accordance with one feature of the invention, the acousto-optical medium 21 is made of a material such as lithium niobate which has a refractive index that varies with the amplitude and frequency of sound waves propagated within the material. Attached to medium 21 are six piezoelectric transducers 23–28 which have terminals 1 through 6 that are respectively connected to the terminals 1 through 6 of high frequency electrical sources 30 through 35. The sources 30 through 35 can be connected to their various terminals through switches 29. Each of the sources 30 through 35 deliver different output frequencies. Hence, by closing appropriate switches 29, different frequencies can be applied to the different transducers 23–28 in any of a large number of combinations. Preferably, any given applied frequency should be applied to two transducers simultaneously to set up standing wave patterns in the medium 21. The various applied frequencies are also preferably in the microwave region and are delivered to the transducers by coaxial cables having inner and outer conductors both of which are connected to each transducer.

By a mechanism known in the art, the excited transducers 23–28 radiate acoustical power into the acousto-optical diffusing medium 21 in response to applied electrical power. The acoustic waves within the medium have frequencies determined by the applied electrical frequencies; these acoustic waves in turn vary the index of refraction within the medium. Since different transducers are simultaneously excited, an extremely complex frequency pattern exists within the medium which diffracts and refracts the subject beam 14 to give the diffused optical output 22.

During each successive recording, a different combination of frequencies are applied to the acousto-optical diffusing medium 21. For example, during the recording of the image of slide 13A, connections between the transducers and frequency sources are as follows: transducers 23 and 24 to source 30, transducers 25 and 28 to source 31, and transducers 26 and 27 to source 32. During the recording of the image of slide 13B, switches 29 are adjusted, for example, to make the following connections: transducers 23 and 24 to source 33, transducers 25 and 28 to source 34, and transducers 26 and 27 to source 35. Other different frequency combinations are made with each successive recording. It can be appreciated that while the subject beam 14 is always diffused by the medium 21, it is diffused in a different manner during each successive recording.

After multiple exposure, the photographic medium 12 is developed to form a hologram photographic transparency 12' from which the various stored recordings can be selectively reconstructed or "read out" by the apparatus shown in FIG. 2. Light from the source 11 is suitably reflected to direct a reconstructing beam 20' against the back surface of the developed hologram transparency 12'. The reconstructing beam 20' is projected in a direction antiparallel with the direction of impingement of the reference beam 20 of FIG. 1; that is, reconstructing beam 20' impinges on the back surface of the hologram transparency 12' at the same angle as the angle of impingement of the recording reference beam 20 on the front surface of the photographic medium 12 of FIG. 1. The reconstructing beam light 20' is diffracted by the multiple hologram recordings and is projected through the acousto-optical diffusing medium 21.

The transducers 23–28 of FIG. 2 are connected to frequency sources 30–35 in accordance with the desired image reconstruction. For example, if the image of slide 13A of FIG. 1 is to be reconstructed, the same transducer-frequency source interconnections are made as were made during the recording of slide 13A. In the example given before, the image of slide 13A is reconstructed by interconnecting the frequency sources and the transducer as follows: transducers 23 and 24 to source 30, transducers 25 and 28 to source 31, and transducers 26 and 27 to source 32. With this excitation, the diffusing characteristics of the medium 21 will duplicate the diffusing characteristics during the recording of slide 13A. It can be shown that when this requirement is met, the image of slide 13A will be projected from medium 21 to a translucent screen 37. The image projected on screen 37 is a complex conjugate image, or a real image, and can be detected without lenses; the screen merely aids in observation. Alternatively, screen 37 may be a photographic medium which will photographically record the projected image.

It can be appreciated that the different diffusing characteristics of the acousto-optic diffusing medium 21 are, in effect, codes for permitting selective reproduction. A recorded image can be reconstructed only if the diffusing characteristics of the medium 21 match those that were used during the recording of that image. The various other superimposed hologram recordings diffract the reconstructing beam 20' during the read-out step, but the images that they represent are not reconstructed because they are arbitrarily diffused by the medium 21. Because of the diffusion of all but the desired reproduced image, my invention greatly reduces the problem of cross-talk. Undesired images are not reproduced and the light diffracted by undesired hologram recordings is projected from the medium 21 as low-intensity "white noise." Although the diffused white noise light is projected onto the screen 37, other images will not be confused with the desired reconstructed image.

Because conflicting images are, in effect, filtered out by the medium 21, thick photosensitive media, as described in the Pennington application, need not be used for successful hologram superimpositions. Even if the hologram recordings are completely two-dimensional they can be separately reconstructed. In effect, the diffused images may all be reconstructed by the reconstructing beam 20', but only the desired image is made coherent, recognizable, and of high intensity contrast, by the acousto-optical diffusing medium 21. Hence, three-dimensional hologram diffraction grating are not required as in the Pennington case.

As was described in the afore-mentioned Pennington application, the various recorded images may simply be light spots at different locations. Then, if an array of photodetectors is substituted for the screen 37, the photodetector to which high intensity light is directed is energized, and a signal is released that is indicative of the location of the stored light spot. Alternatively, a vidicon tube may be used at the location of screen 37 for detecting the location of high intensity light. In applications of this type, in which automatic read-out is made by some sort of light responsive device, the reduction or elimination of cross-talk is important for avoiding spurious responses.

The acousto-optic medium 21 has been given only as one example of variable diffusing media that could be used. Physically different diffusing media could be mechanically interchanged during record and read-out to give the required changes of diffusion characteristics. The only requirement for the various diffusing characteristics that could be used is that they be reproducible; the specific characteristics used during recording of an image must be substantially duplicated for subsequent read-out of that image. The acousto-optical medium 21 has the advantage of being electrically switchable between different states giving different diffusion characteristics, so that known high speed electrical switching techniques can be incorporated into the system. Devices which have diffusion characteristics that vary as a function of applied electric field, known as electro-optical devices, could also be substituted for the acousto-optical medium.

The transparent slides 13A, 13B, et cetera, should be considered as being illustrative of one technique for intensity modulating the subject light beam 14. Various forms of modulation and modulating devices could be used for impressing whatever information may be desired onto the subject light beam. Three-dimensional images of solid objects can also be stored in this manner and reconstruction observed without a screen. The various optical devices for deriving the reference beams 20 and 20' should also be considered as being merely illustrative. Various other modifications and embodiments of the invention may be made by those skilled in the art without departing from the spirit and scope of the invention.

What is claimed is:
1. An optical storage and retrieval system comprising:
means for projecting a subject coherent light beam along a path to a front surface of a photographic recording medium having major front and rear surfaces;
means for successively modulating at least one of the phase and the amplitude of said beam with different information quanta;
a diffusing medium located along the path between the modulating means and the photographic medium;
means for successively changing the light diffusion characteristics of the diffusing medium with successive changes of beam modulation;
means for directing a coherent reference beam having a constant phase relation to the subject beam at the photographic medium front surface at a constant angle with respect to the subject beam, thereby forming superimposed hologram recordings of the information of the subject beam; and
means for directing a coherent reconstructing beam conjugate to the reference beam in a direction anti-parallel to the reference beam path against the rear surface of the photographic medium, whereby diffraction by the superimposed hologram recordings directs the reconstructing beam through the diffusing medium for selective reconstruction of information recorded on the photographic medium.

2. The apparatus of claim 1 wherein:
a diffusing medium is an acousto-optical medium having an index of refraction that changes as a function of acoustic wave patterns therein;
and the light diffusion characteristic changing means comprises means for exciting different acoustic wave patterns in the diffusing medium.

3. The apparatus of claim 2 wherein the light diffusion characteristic changing means further comprises:
a plurality of high frequency electromagnetic wave sources;
a plurality of transducers attached to the acousto-optical diffusing medium and interconnected to the high frequency sources; and
means for switching the transducer interconnections to the frequency sources.

4. The method of optically storing and retrieving information comprising the steps of:
projecting a coherent subject light beam through a diffusing medium to a front surface of a photographic recording medium having major front and rear surfaces;
successively modulating at least one of the phase and the amplitude of the subject beam with different information quanta prior to projection through the diffusing medium;
successively changing the diffusion characteristics of the diffusing medium with each successive change of information modulation of the subject light beam;
directing a reference light beam that has a constant phase relation to the subject light beam against the photographic medium front surface at a constant angle for forming superimposed hologram recordings of the successive information quanta of the first light beam;
directing a reconstructing light beam conjugate to the reference beam against the rear surface of the developed photographic medium, in a direction anti-parallel to the direction of the reference beam, through the diffusing medium; and
adjusting the diffusion characteristics of the diffusing medium to correspond with the characteristics of the diffusing medium used during the recording of one of the information quanta.

5. The method of claim 4 wherein:
the step of changing the diffusing characteristics comprises the step of exciting different complex acoustic wave patterns in an acousto-optical diffusing medium.

6. The method of optically storing and retrieving information comprising the steps of:
projecting a coherent subject light beam through a diffusing medium having first diffusing characteristics to a front surface of a photographic recording medium having major front and rear surfaces;
modulating at least one of the phase and the amplitude of the subject beam with first information quanta prior to projection through the diffusing medium;
directing a reference light beam that has a constant phase relation to the subject light beam against the photographic medium front surface at a first angle for forming a hologram recording of the first information quanta;
projecting a coherent subject light beam through a diffusing medium having second diffusing characteristics to the front surface of the photographic medium;
modulating at least one of the phase and the amplitude of the subject beam with second information quanta prior to projection through the diffusing medium;
directing a reference light beam that has a constant phase relation to the subject light beam against the photographic medium front surface at the first angle for forming a hologram recording of the second information quanta superimposed on the hologram recording of the first information quanta; and directing a reconstructing light beam conjugate to the reference beam against the rear surface of the photographic medium, in a direction antiparallel to the direction of the reference beam, and through a diffusing medium located in the same position with respect to the photographic medium as the diffusing media were during formation of the hologram recordings, said diffusing medium used in reconstruction having the same diffusing characteristics as one of the diffusing media used in forming one of the hologram recordings.

References Cited

Leith et al., S.P.I.E. Journal, vol. 4, Oct./Nov. 1965, pp. 3–6.

Kogelnik: Bell Sys. Tech. Jour., vol 44, December 1965, pp. 2451–2455.

DAVID SCHONBERG, Primary Examiner

R. J. STERN, Assistant Examiner

U.S. Cl. X.R.

350—161